(12) United States Patent
May

(10) Patent No.: US 8,585,231 B1
(45) Date of Patent: Nov. 19, 2013

(54) GRAVE MARKER ASSEMBLY

(76) Inventor: Jesse C. May, Colwich, KS (US)

(*) Notice: Subject to any disclaimer, the term of this patent is extended or adjusted under 35 U.S.C. 154(b) by 259 days.

(21) Appl. No.: 13/111,196

(22) Filed: May 19, 2011

(51) Int. Cl.
*F21L 4/00* (2006.01)
*F21V 33/00* (2006.01)

(52) U.S. Cl.
USPC .......... 362/183; 362/191; 362/253; 362/276; 362/1

(58) Field of Classification Search
USPC ............... 362/183, 190, 191, 253, 276, 802; 52/103, 104, 133
See application file for complete search history.

(56) References Cited

U.S. PATENT DOCUMENTS

| | | |
|---|---|---|
| D30,813 S | 5/1899 | Murphy |
| 1,926,468 A | 9/1933 | Vogelpohl |
| 4,441,143 A * | 4/1984 | Richardson, Jr. ............. 362/183 |
| 4,999,060 A | 3/1991 | Szekely et al. |
| 5,041,952 A | 8/1991 | Janda et al. |
| 5,211,470 A | 5/1993 | Frost et al. |
| 5,367,442 A | 11/1994 | Frost et al. |
| 5,599,091 A | 2/1997 | Kira |
| 5,651,606 A | 7/1997 | Krogman |
| D414,579 S | 9/1999 | Denison et al. |
| D417,519 S | 12/1999 | Cutler |
| 6,573,659 B2 | 6/2003 | Toma et al. |
| D492,053 S | 6/2004 | Graves et al. |
| 6,764,197 B1 | 7/2004 | Zemar |
| D494,536 S | 8/2004 | Pu |
| D495,083 S | 8/2004 | Lam |
| 6,902,292 B2 | 6/2005 | Lai |
| D517,720 S | 3/2006 | Sanoner |
| 7,033,045 B1 | 4/2006 | Kinkead |
| D528,242 S | 9/2006 | Wood |
| D529,655 S | 10/2006 | Allsop et al. |
| D531,748 S | 11/2006 | Sanoner |
| D535,584 S | 1/2007 | Garrett |
| 7,172,307 B2 | 2/2007 | Izardel |
| D542,959 S | 5/2007 | Yao |
| 7,217,015 B2 | 5/2007 | Cocciardi |
| 7,241,023 B1 | 7/2007 | Carpenter |
| D553,778 S | 10/2007 | Phillips |
| D554,792 S | 11/2007 | Sanoner |
| D557,435 S | 12/2007 | Hon et al. |
| 7,311,414 B2 | 12/2007 | Norton et al. |
| 7,328,835 B2 | 2/2008 | Menghini |
| D580,082 S | 11/2008 | Zemar |
| 7,635,196 B2 | 12/2009 | Monahan |
| D608,924 S | 1/2010 | Snyder et al. |
| 7,708,424 B2 | 5/2010 | Richmond |
| 7,770,324 B2 | 8/2010 | Hogan |
| D624,683 S | 9/2010 | Liang |
| 2005/0083693 A1 | 4/2005 | Garrett |

(Continued)

*Primary Examiner* — Thomas Sember
(74) *Attorney, Agent, or Firm* — Kenneth H. Jack; Davis & Jack, L.L.C.

(57) ABSTRACT

A grave marker assembly including a support arm having proximal and distal ends, a flagpole mounting loop fixedly attached to or formed wholly with the support arm's proximal end, the flagpole mounting loop being adapted for, upon an engagement of a flagpole with the flagpole mounting loop, extending the support arm from the flagpole; a solar cell fixedly attached to the support arm; an electric light emitter fixedly attached to the support arm; a rechargeable electric storage battery fixedly attached to the support arm; and a network of electrical conductors operatively interconnecting the solar cell, the electric light emitter, and the rechargeable electric storage battery for, upon exposure of the solar cell to sunlight, charging the rechargeable electric storage battery, and upon a termination of the exposure to sunlight, actuating the electric light emitter.

13 Claims, 4 Drawing Sheets

(56) References Cited

U.S. PATENT DOCUMENTS

| | | |
|---|---|---|
| 2005/0279403 A1 | 12/2005 | Kube |
| 2006/0023446 A1 | 2/2006 | Racoosin |
| 2006/0109651 A1* | 5/2006 | Cocciardi ............ 362/253 |
| 2008/0013306 A1 | 1/2008 | Guilmette |
| 2010/0313492 A1 | 12/2010 | Shellhouse et al. |

* cited by examiner

GRAVE MARKER ASSEMBLY

FIELD OF THE INVENTION

This invention relates to grave and burial site assemblies which incorporate U.S. flags. More particularly, this invention relates to such assemblies which facilitate displays of U.S. flags during nighttime.

BACKGROUND OF THE INVENTION

The grave or burial sites of deceased persons having a history of service in the U.S. armed services are commonly marked with decorative and commemorative plaques. Commonly, such plaques are made of bronze or brass, and such plaques often bear in bold relief upon their front sides the insignia of a military service unit (e.g., company insignia, battalion insignia, brigade insignia, division insignia, corp insignia, etc.) within which a deceased service person had served, along with further insignia designating the years of service of the deceased service person. Such plaques also commonly include a fixedly attached and downwardly extending ground spike for anchoring the plaque upon and extending the plaque upwardly from the ground at a location near such deceased service person's grave site. Such plaques also commonly present a vertically aligned series of flagpole receiving eyes or loops which may receive the lower end of a dowel rod flagpole. Typically, such flagpoles bear and display a country flag such as a U.S. flag at its upper end, such flag flying directly over the plaque.

The practice of utilizing grave marking plaques of the type described above for support of country flags, such as U.S. flags creates, and gives rise to problems relating to the proper flag use and flag display. For example, military regulations adopted in the United States, such as Army Regulation 840-10, Chapter 2, Subsection 2, Sub-Subsections (e) and (f), specify that the flag of the United States may be displayed during daytime "from reveille to retreat" and that twenty-four hour displays of the U.S. flag must be "properly illuminated with its own source of light during hours of darkness." Regardless of whether a U.S. military regulation, such as AR 840-10 cited above, has controlling application to a particular usage of a country flag, such as the U.S. flag within a cemetery, the families and loved ones of deceased military personnel often desire to comply with and follow the spirit of honoring the flag by complying with such regulations. Removal of grave marker country flags during night hours is time consuming and burdensome, often leading to a family's undesirable choice and decision to forego usage and display of the country flag at a military service person's grave site.

The instant inventive grave marker assembly solves or ameliorates the problems and conflicting purposes described above by incorporating within a grave marker assembly a specially configured support arm which incorporates a solar powered LED light and a rechargeable electric storage battery combination for nighttime illumination of U.S. or other country flags which are incorporated as a part of the assemblies.

BRIEF SUMMARY OF THE INVENTION

A first structural component of the instant inventive grave marker assembly comprises a support arm which has a proximal attachment end and has a distal electric light supporting end. In a preferred embodiment, the support arm constitutes a rigid structure which forms and defines a hollow interior space for receiving and housing internal components such as a rechargeable electric storage battery, and automatic switching circuitry for switching between battery charging and light illuminating functions (such functions being further discussed below). The hollow storage space character of the support arm is preferably achieved through adoption of a plastic injection molded "clam shell" case configuration.

A further structural component of the instant inventive grave marker assembly comprises first flagpole mounting means which are fixedly attached to and forwardly extend from the support arm's proximal end. In the preferred embodiment, the first flagpole mounting means are adapted for, upon receipt of or engagement with a flagpole, perpendicularly extending or cantilevering the support arm from the flagpole.

A further structural component of the instant inventive grave marker assembly comprises a photovoltaic solar cell which, upon exposure to sunlight, is adapted for generating a DC current having a voltage suitable for charging a rechargeable electric storage battery. For example, where a 1.5 volt rechargeable electric storage battery is housed within the support arm, the solar cell is preferably adapted to generate 1.5 volts. Preferably, the rechargeable electric storage battery comprises a nickel-cadmium battery. Alternatively, such battery may comprise a nickel-metal hydride battery, a nickel-zinc battery, or an alkaline-manganese battery. The battery of the invention may comprise a plurality of cells arranged in parallel or series. The solar cell is preferably fixedly attached to an upper surface of the support arm element, such position effectively exposing the solar cell to overhead sunlight.

A further structural component of the instant inventive grave marker assembly comprises an electric light. In the preferred embodiment, the electric light constitutes one or more low voltage light emitting diodes. Suitably, an incandescent bulb may be alternatively used. Also suitably, a fluorescent bulb may be alternatively used.

Further structural components of the instant inventive grave marker assembly comprise a network of electrical conductors which are adapted for operatively interconnecting the solar cell, the electric light, and the rechargeable electric storage battery. The network of electrical conductors is preferably housed within the preferred hollow interior space of the support arm, and such network is preferably adapted for, upon exposure of the solar cell to sunlight, charging the rechargeable electric storage battery and, during hours of darkness, switching to discharging operation of the battery for powering the electric light. The network of electrical conductors preferably comprises an automatic switching circuit which is adapted for performing the automatic switching function through sensing the presence or absence of current generated by the solar cell.

In use of the instant inventive grave marker assembly, and assuming that a flagpole bearing, for example, a U.S. flag is supported at the back side of a ground mounted plaque marking the grave site of a deceased military service person, the support arm component (bearing, as preferred, each of the light emitting diode, solar cell, rechargeable battery, and wiring network components described above) may be engaged with such flagpole for cantilevering support at the back side of the plaque. Preferably, the light emitting diode is positioned upon the support arm to emit light upwardly for nighttime illumination of the overlying U.S. flag. According to the operation of the instant invention, during daylight hours when no flag illumination is needed, sunlight bearing against the upwardly exposed solar cell charges the assembly's electric storage battery. At the onset of darkness, battery charging terminates and, via automated switching provided by the automatic switching circuitry, the battery commences to discharge for powering the preferred light emitting diode.

According to the function of the invention, the family members of the deceased service person are advantageously relieved of the responsibility of removing the U.S. flag at dusk, the flag being illuminated each night by the electric charge generated and stored each day within the battery.

Accordingly, objects of the instant invention include the provision of a grave marker assembly which incorporates structures as, described above, and which arranges those structures in relation to each other in manners described above for achievement of the benefits, functions, and advantages described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
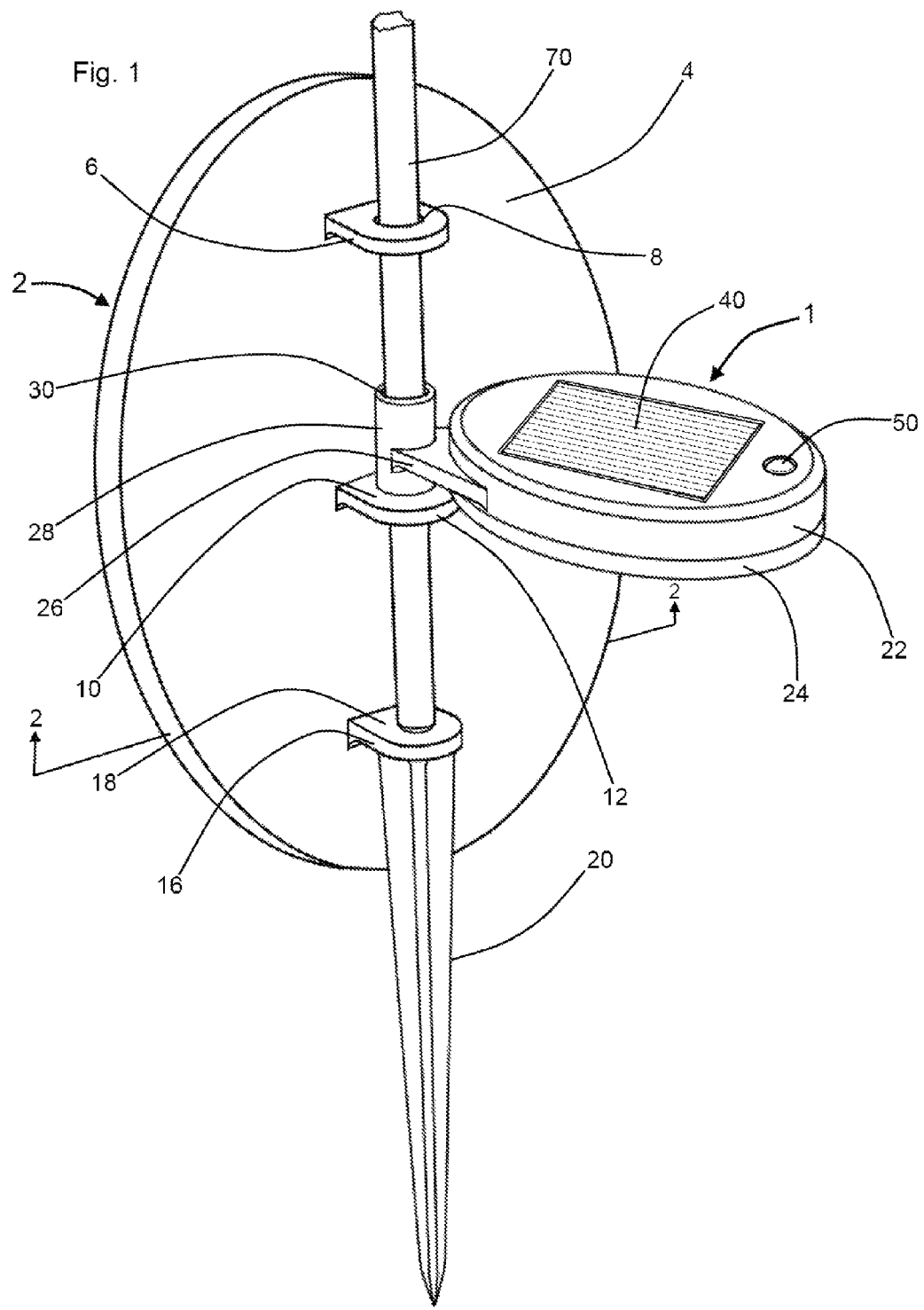
FIG. 1 is a perspective partial view of the instant inventive grave marker assembly.
Figure 2:
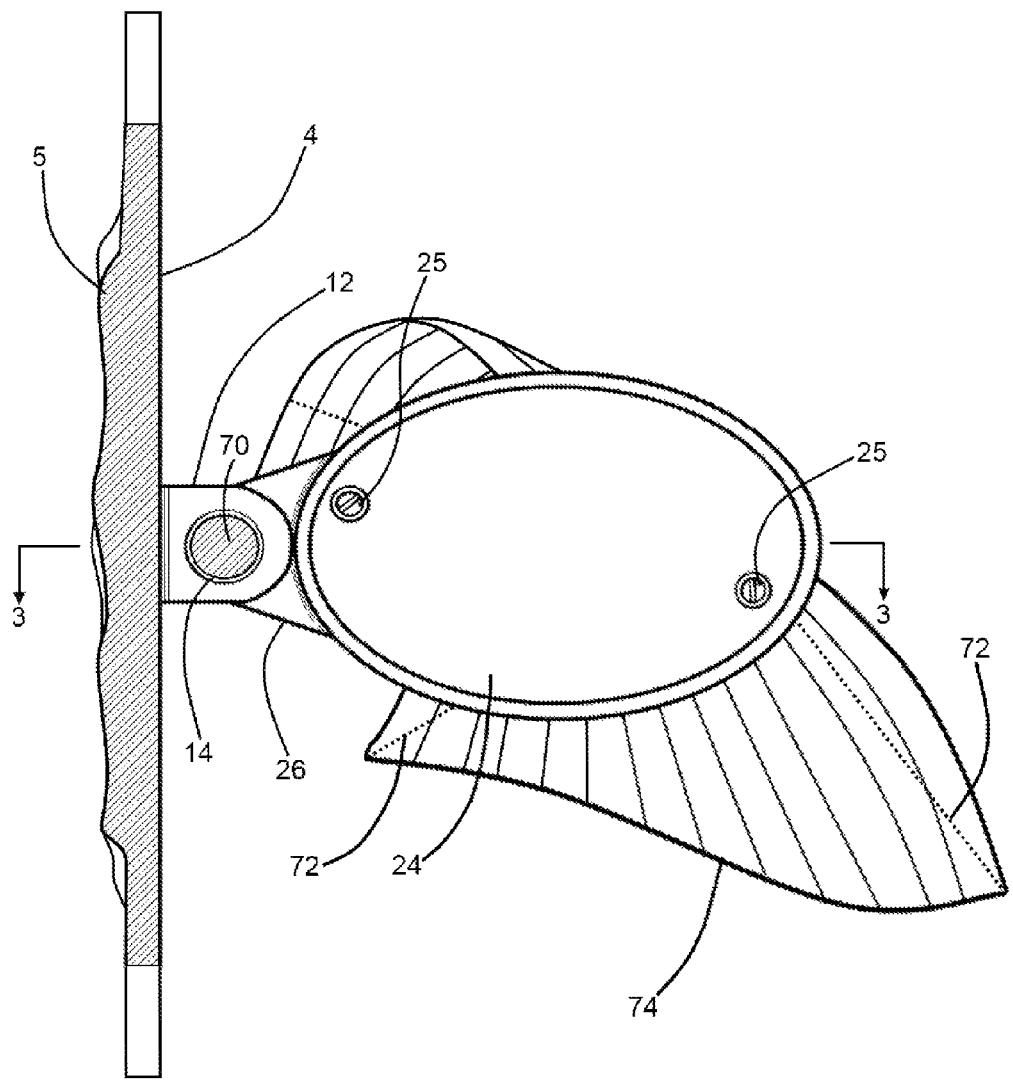
FIG. 2 is a sectional view as indicated in FIG. 1.
Figure 3:
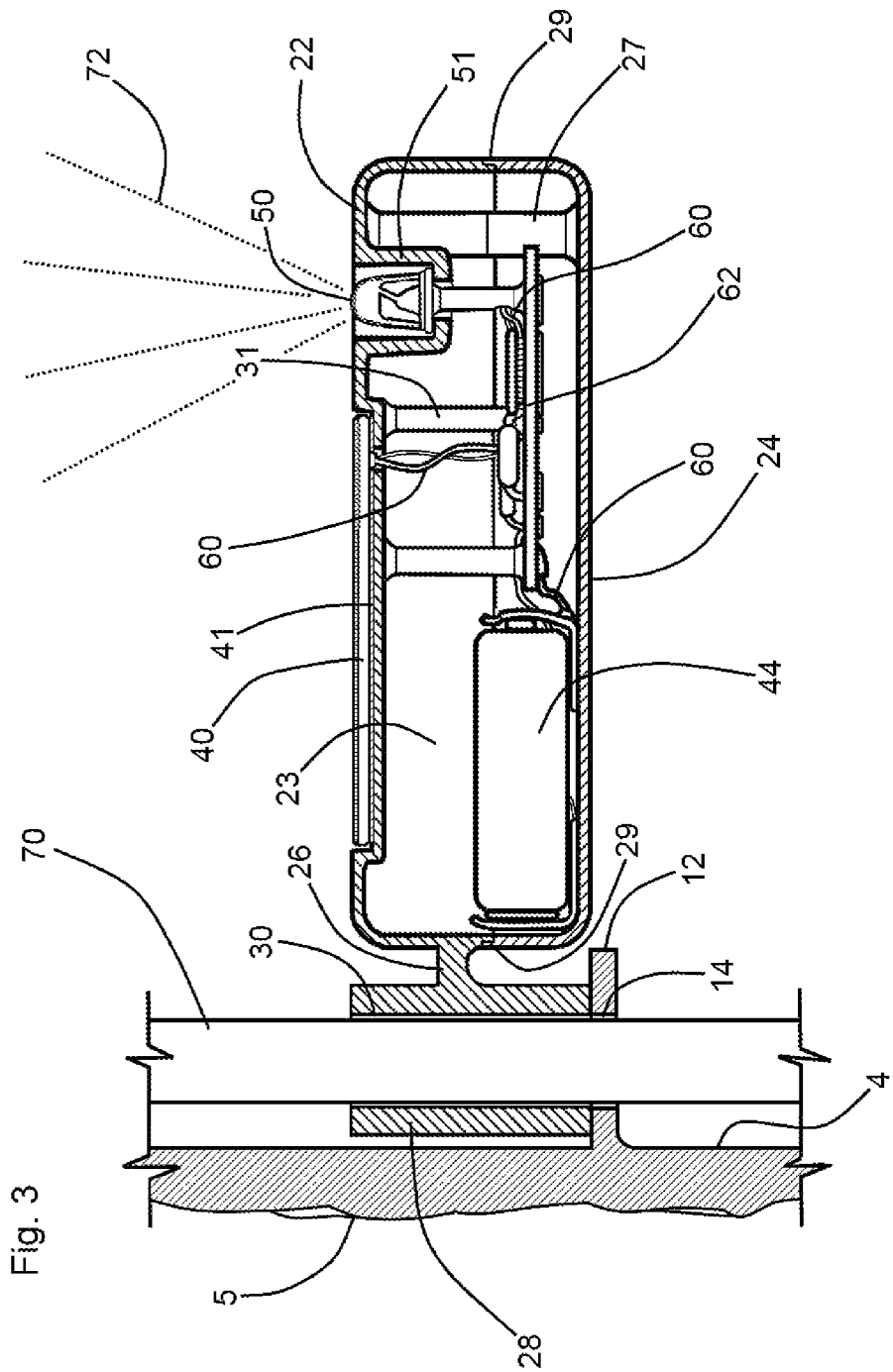
FIG. 3 is an alternative sectional view as indicated in FIG. 2.

Referring now to the drawings, and in particular to FIG. 1, the instant inventive grave marker assembly comprises a support arm which is referred to generally by Reference Arrow 1. Referring further simultaneously to FIG. 3, the support arm 1 preferably forms and defines a hollow interior space 23, such space being bounded by an upper "clam shell" case half 22 and a lower "clam shell" case half 24. In the preferred embodiment, the upper and lower clam shell case halves 22 and 24 join at a coffered seam 29, such seam resisting intrusions of dirt, moisture, and debris into space 23. Referring further simultaneously to FIG. 2, screw mounting posts 27 preferably vertically span the interior space 23 for interconnecting clam shell halves 22 and 24, such posts 27 receiving vertically extending screw fasteners 25.

Referring to FIG. 1, the instant inventive grave marker assembly preferably further comprises first flagpole mounting means which forwardly extend from and are either fixedly attached to or formed wholly with the proximal end of the support arm 1. Such first flagpole mounting means preferably comprise a first loop which incorporates a cantilevering connector 26 and a vertically opening sleeve 28. As shown in FIG. 1, such eye loop connector may receive a flagpole 70 within the bore 30 of sleeve 28. Upon such flagpole receipt, the first flagpole mounting means extends and cantilevers the support arm 1 from the flagpole 70.

Referring further to FIG. 1, support arm 1 preferably supports and has fixedly attached to its upper surface a photovoltaic solar cell 40. Referring further simultaneously to FIG. 3, the photovoltaic solar cell 40 is preferably mounted by a thin adhesive pad 41 within a fitted recess within the upper surface of clam shell half 22, such positioning upwardly orienting the solar cell 40 for receipt of sunlight.

Referring to FIG. 3, a rechargeable electric storage battery 44 is preferably housed within the interior space 23 defined by clam shell halves 22 and 24. An electric light emitter, preferably in the form of a light emitting diode 50, is also preferably mounted at the distal end of the upper clam shell half 22. The light emitting diode 50 is preferably received and mounted within an upwardly opening socket 51 for casting light 72 upwardly therefrom. The light emitting diode 50 is representative of other commonly known and alternatively utilized light emitters such as incandescent bulbs and fluorescent bulbs.

A network of electrical conductors 60 operatively interconnects the solar cell 40, the battery 44, and the light emitting diode 50, such network 60 preferably incorporating automatic switching circuitry 62. The automatic switching circuitry 62 is preferably fixedly attached to and suspends from the upper clam shell half and within space 23 by suspension ties 31. Such network of electrical conductors 60,62 is preferably adapted for, upon exposure of the solar cell 40 to sunlight, routing of electrical energy produced by the solar cell 40 for charging the rechargeable battery 44. During nighttime, the automatic switching circuitry terminates such battery charging function and causes the battery 44 to commence discharging its stored charge for illuminating the electric light 50.

Referring to FIGS. 1 and 2, the instant inventive grave marker assembly preferably further comprises a plaque which is referred to generally by Reference Arrow 2, the plaque 2 having a front side bearing bold relief military service unit indicia 5. Second flagpole mounting means are preferably fixedly attached to or formed wholly with the back or rearward side 4 of the plaque 2. In the preferred embodiment, the second flagpole mounting means comprise an upper loop 6 having a vertically opening eye 6 and a lower loop 12 having a vertically opening eye 14. Upon receipt of flagpole 70 within eyes 6 and 14 of loops 6 and 12, such loops effectively position the plaque 2 oppositely from the support arm 1. In the configuration depicted in FIG. 1, the triple of loops including upper and lower loops 6 and 12 and the medially positioned loop 26,28, advantageously function as locking means for resisting removal of the support arm 1. In such locking means, the undersurface of loop 6 blocks upward withdrawal of the support arm 1, the upper surface 10 of loop 12 blocks downward withdrawal thereof, and the flagpole 70 blocks any lateral or horizontal withdrawal thereof. Additional locking means components may comprise an additional fastener (not depicted within views) adapted for resisting upward withdrawal of flagpole out of loops 6, 26,28, and 12.

Figure 4:
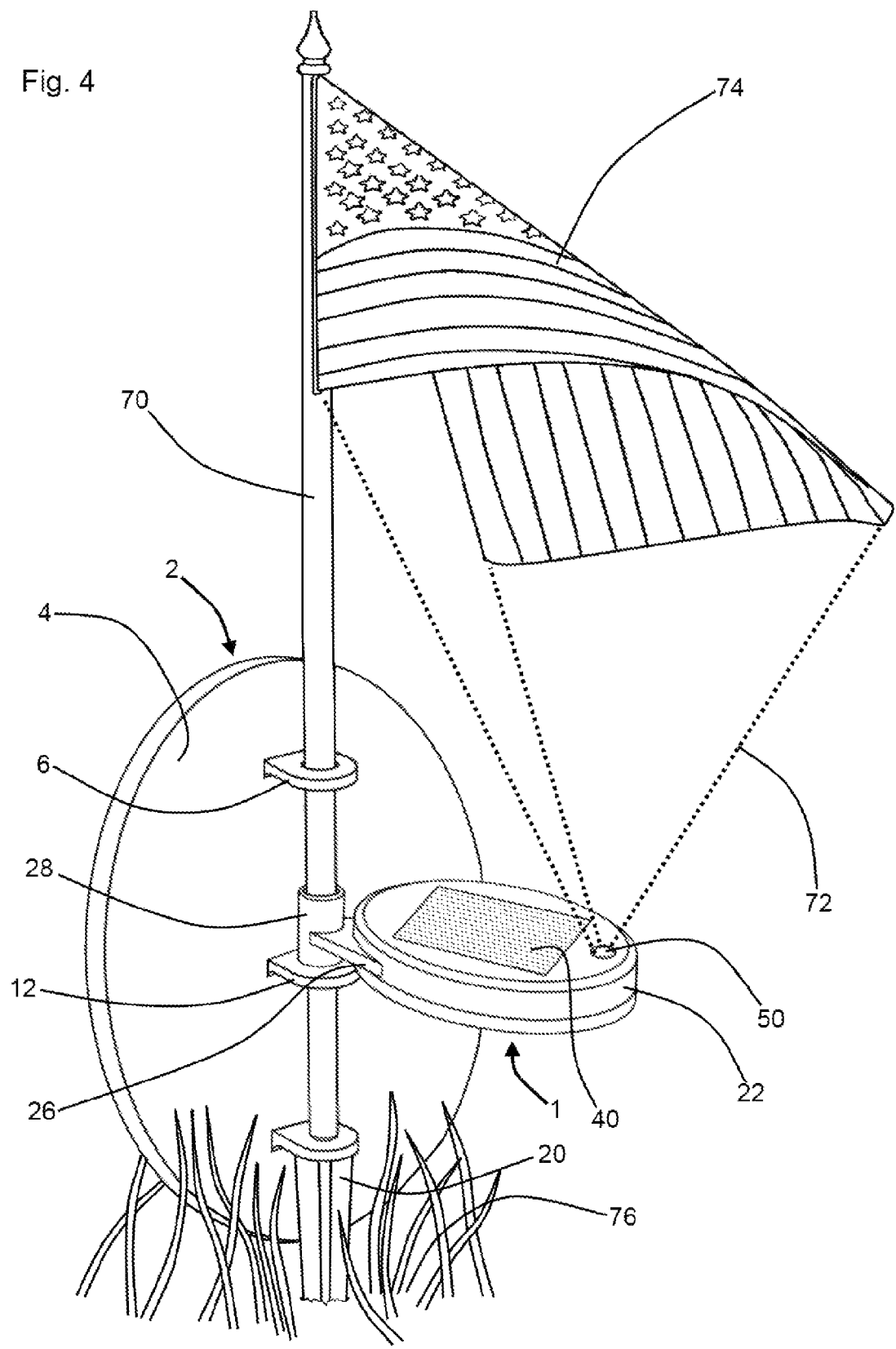
FIG. 4 represents an "in use" configuration of the instant inventive assembly.

Referring to FIG. 1, the instant inventive grave marker assembly preferably further comprises a ground spike 20 whose upper end 16 is fixedly attached to or formed wholly with the back side 4 of the plaque 1. The upper end of the spike 20 preferably presents an upwardly facing land 18 which serves as a shelf for abutting contact with and support of the lower end of the flagpole 70. Referring further simultaneously to FIG. 4, upon driving of the spike 20 downwardly into the ground 76, the spike 20 in combination with its plaque attaching upper end 16, upwardly extends and displays the plaque 2 from the ground 76.

In use of the instant inventive grave marker assembly, referring simultaneously to all figures, a user may initially grasp plaque 2, and may orient the plaque 2 so that its ground spike 20 is directed downwardly. Thereafter, the user may drive the plaque 2 downwardly, causing the spike 20 to embed within the ground 76 as depicted in FIG. 4. Thereafter, the user may grasp the support arm 1 and may position the support arm's eye loop/first flagpole mounting means 26,28 so that such means resides medially between loops 6 and 12 which serve as the plaque's second flagpole mounting means. Thereafter, the user may successively thread the lower end of the flagpole 70 downwardly through the eye 8 of loop 6, through the bore 30 of sleeve 28, and through the eye 14 of loop 12, until the lower end of the flagpole 70 rests upon land 18. Following such flagpole installation, the engagement of the flagpole with the first and second mounting means' loops advantageously locks the support arm 1 in its depicted use position, and causes the support arm 1 to rearwardly extend and cantilever from flagpole 70 for casting light 72 upwardly toward a country flag, such as U.S. flag 74.

As is indicated in FIG. 4, the wind has blown the flag 74 away from the viewer, and the support arm 1 is correspondingly shown as being angled away from the viewer. Such correspondence of positioning of the flag and the support arm is facilitated by the ability of sleeve 28 to pivot about pole 70 in combination with the ability of the side wall of the arm 1 to function as a wind vane. Thus, the invention functions for wind adjusted vertical alignment of the flag 74 over the support arm 1.

During daylight hours, the solar cell 40 charges battery 44. At the onset of darkness, the solar powered battery charging ceases, and the automatic switching circuitry 62 operatively causes the battery 44 to commence discharging for actuating and illuminating light emitting diode 50. Utilization of the instant invention allows the overlying flag 74 to be continuously displayed both during daytime and nighttime hours, with battery charging occurring during daytime hours, and with flag illumination occurring during nighttime hours. Accordingly, the instant invention advantageously eliminates any need for repeated removals and replacements of the flag 74 during successive periods of night and day.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A grave marker assembly comprising:
   (a) a support arm having proximal and distal ends;
   (b) first flagpole mounting means fixedly attached to or formed wholly with the support arm's proximal end, the first flagpole mounting means being adapted for, upon engagement of a flagpole with the first flagpole mounting means, extending the support arm from the flagpole;
   (c) a solar cell fixedly attached to the support arm;
   (d) an electric light fixedly attached to the support arm;
   (e) a rechargeable electric storage battery fixedly attached to the support arm;
   (f) a network of electrical conductors operatively interconnecting the solar cell, the electric light, and the rechargeable electric storage battery for, upon exposure of the solar cell to sunlight, charging the rechargeable electric storage battery, and upon a termination of said sunlight exposure, actuating the electric light;
   (g) a plaque having front and back sides, and
   (h) second flagpole mounting means fixedly attached to or formed wholly with the plaque, the second flagpole mounting means being adapted for, upon further engagement of the flagpole with the second flagpole mounting means, oppositely positioning the plaque with respect to the flagpole.

2. The grave marker assembly of claim 1 further comprising a spike having an upper end, the spike's upper end being fixedly attached to or formed wholly with the plaque, the spike being positioned for, upon driving of the spike downwardly into the ground, extending the plaque upwardly from the ground.

3. The grave marker assembly of claim 1 wherein the support arm's extension is directed backwardly from the plaque's backside.

4. The grave marker assembly of claim 3 wherein the support arm defines a hollow interior space, the rechargeable electric storage battery's fixed attachment positioning the rechargeable electric storage battery within the hollow interior space.

5. The grave marker assembly of claim 4 wherein the support arm has an upper surface, the solar cell's fixed attachment positioning the solar cell upon said upper surface.

6. The grave marker assembly of claim 5 wherein the electric light's fixed attachment positions the electric light for casting light from the support arm's upper surface.

7. The grave marker assembly of claim 6 wherein the flagpole has an upper end and further comprising a country flag fixedly attached to the flagpole's upper end, the electric light's fixed attachment further positioning the electric light for casting light upwardly toward the country flag.

8. The grave marker assembly of claim 1 wherein the first and second flagpole mounting means comprise a plurality of loops, each loop among the plurality of loops being fitted for receiving the flagpole, the first and second flagpole mounting means' fixed attachments extending each loop among the plurality of loops from a structure selected from the group consisting of the plaque's back side, and the support arm's proximal end.

9. The grave marker assembly of claim 8 wherein the plurality of loops comprises a first, a second, and at least a third loop, and further comprising locking means, the locking means being adapted for resisting removal of the support arm from the flagpole, the locking means comprising a triple of loops among the plurality of loops.

10. The grave marker assembly of claim 9 wherein a medial loop among the triple of loops is configured as a slide sleeve, said medial loop extending forwardly from the support arm's proximal end.

11. The grave marker assembly of claim 1 wherein the network of electrical conductors comprises an automatic switching circuit.

12. The grave marker assembly of claim 11 wherein the electric light comprises a light emitting diode.

13. The grave market assembly of claim 12 wherein the rechargeable electric storage battery comprises nickel-cadmium.

* * * * *